United States Patent [19]
Yano et al.

[11] Patent Number: 5,386,218
[45] Date of Patent: Jan. 31, 1995

[54] DISPLAY SYSTEM

[75] Inventors: Haruto Yano; Yoshiaki Hirasa; Toshimichi Tokunaga, all of Hiroshima; Hirofumi Goto, Hyogo; Chisato Yoshida, Hyogo; Kazuhiro Yokouchi, Hyogo, all of Japan

[73] Assignee: Mitsubishi Denki Kabushiki Kaisha, Tokyo, Japan

[21] Appl. No.: 155,540

[22] Filed: Nov. 22, 1993

Related U.S. Application Data

[63] Continuation of Ser. No. 931,452, Aug. 20, 1992, abandoned, which is a continuation of Ser. No. 601,139, Oct. 23, 1990, abandoned.

[30] Foreign Application Priority Data

Oct. 24, 1989 [JP] Japan .................... 1-277558

[51] Int. Cl.$^6$ .............................. G09G 1/06
[52] U.S. Cl. ............................ 345/129; 345/141
[58] Field of Search ............ 345/128, 129, 130, 127, 345/141; 382/44, 47; 395/139

[56] References Cited

U.S. PATENT DOCUMENTS

| | | | |
|---|---|---|---|
| 4,511,267 | 4/1985 | Pokorny et al. | 340/731 |
| 4,896,147 | 1/1990 | Futakata | 340/731 |

FOREIGN PATENT DOCUMENTS

| | | | |
|---|---|---|---|
| 55-47537 | 4/1980 | Japan | 340/731 |
| 61-195661 | 12/1986 | Japan . | |
| 2038055 | 7/1980 | United Kingdom | 340/712 |

*Primary Examiner*—Ulysses Weldon
*Assistant Examiner*—Doon Chow

[57] ABSTRACT

A display device for visually representing selected characters in dot patterns includes a circuit for determining the number of characters to be visually represented and a circuit for outputting, in response to the result of the determination, a dot pattern signal of a size rendered relatively greater in accordance with a reduction in the number of such characters. Since the displayed character size is enlarged as the number of the characters is reduced, the visual representation can be easily seen on the display screen.

12 Claims, 6 Drawing Sheets

DISPLAY SYSTEM

This application is a continuation of application Ser. No. 07/931,452 filed on Aug. 20, 1992, now abandoned; which was a continuation of application Ser. No. 07/601,139 filed on Oct. 23, 1990, now abandoned.

BACKGROUND OF THE INVENTION

1. Field of the Invention

The present invention relates to a display device for visually representing selected characters on a display screen.

2. Description of the Prior Art

In any of the conventional display devices known heretofore, it has been customary that characters selected by an operator are visually represented in sequence on a display screen by actuation of keys corresponding to such characters.

Particularly in a display device applied to an electronic desk calculator, an electronic pocket notebook, an automotive telephone equipment or the like, the size of characters to be displayed is previously determined. And the size is so specified that each character is maximally representable on a display screen.

Due to such structure of the conventional display device, there exists a problem that, when characters of a telephone number or the like are to be visually represented, the entire characters are displayed as having the same size regardless of the count of the digits of the telephone number, so that there is some difficulty in seeing the visual representation on the screen.

SUMMARY OF THE INVENTION

The present invention has been accomplished in view of such circumstances. Its object is to provide an improved display device where the character size on a screen is changeable in accordance with the number of displayed characters to consequently achieve enhanced visual facility.

According to the display device of the present invention, there are included a means for determining the number of characters to be displayed, and a means for outputting a dot pattern signal indicative of the size of each dot conforming with the number of the characters.

In the display device of the persent invention, the dot pattern signal obtained from the pattern output means indicates a dot size which is changeable to become relatively greater in accordance with a reduction in the number of the characters to be displayed.

The above and other features and advantages of the present invention will become apparent from the following description which will be given with reference to the illustrative accompanying drawings.

DETAILED DESCRIPTION OF THE PRESENT INVENTION

Hereinafter preferred embodiments of the present invention will be described with reference to the accompanying drawings.

Figure 1:
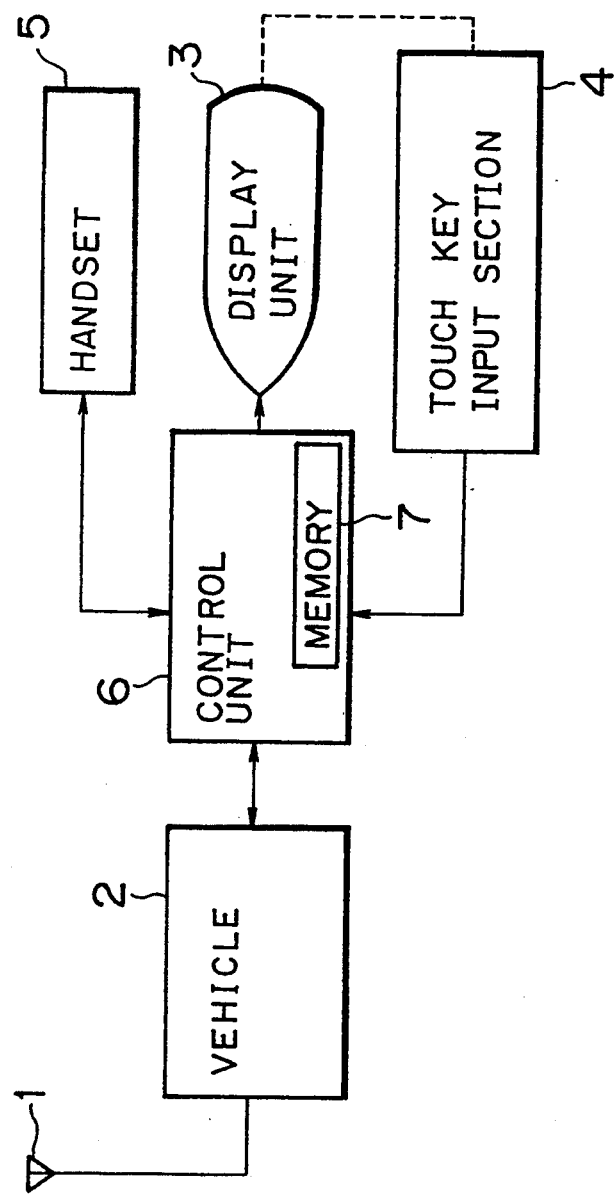
FIG. 1 is a block diagram of an exemplary constitution where a display device embodying the present invention is applied to an automotive telephone equipment.

FIG. 1 is a block diagram showing an exemplary constitution of an automotive telephone equipment where a display device embodying the present invention is applied. In this diagram, there are included an antenna 1; a mobile vehicle 2 serving as a transmitter-receiver which is furnished with the antenna 1 and is movable with a function of transmitting and receiving dial tone or voice by means of radio waves; a display unit 3 composed of a cathode-ray tube or the like for visually representing a pattern of touch switches or an input telephone number; and a touch key inputted section 4 of a known pressure sensitive type or infrared type disposed on a screen of the display unit 3. The entire area of the touch key input section 4 is divided into 20 portions for example, and when one of such divided areas is actuated by a touch, a serial signal corresponding to the touched area is generated. Also shown are a telephone handset 5 for converting an input sound into an audio signal or an audio signal into a sound, and a control unit 6 connected to all of the above-described mobile vehicle 2, display unit 3, touch key input section 4 and telephone handset 5. This unit 6 comprises an input-output interface circuit, a display controller for controlling the visual representation on the display unit 3, a CPU (central processing unit) for computing and processing digital data in accordance with a predetermined control program, an A/D (analog-to-digital) converter for converting an analog input signal into a digital signal, a D/A (digital-to-analog) converter for converting a digital signal into an analog output signal, and a memory, 7 where the control program for the CPU and dot patterns of numerals 0 to 9 are stored with respect to both full-angle size and half-angle size (half in width of full-angle size).

Figure 2:
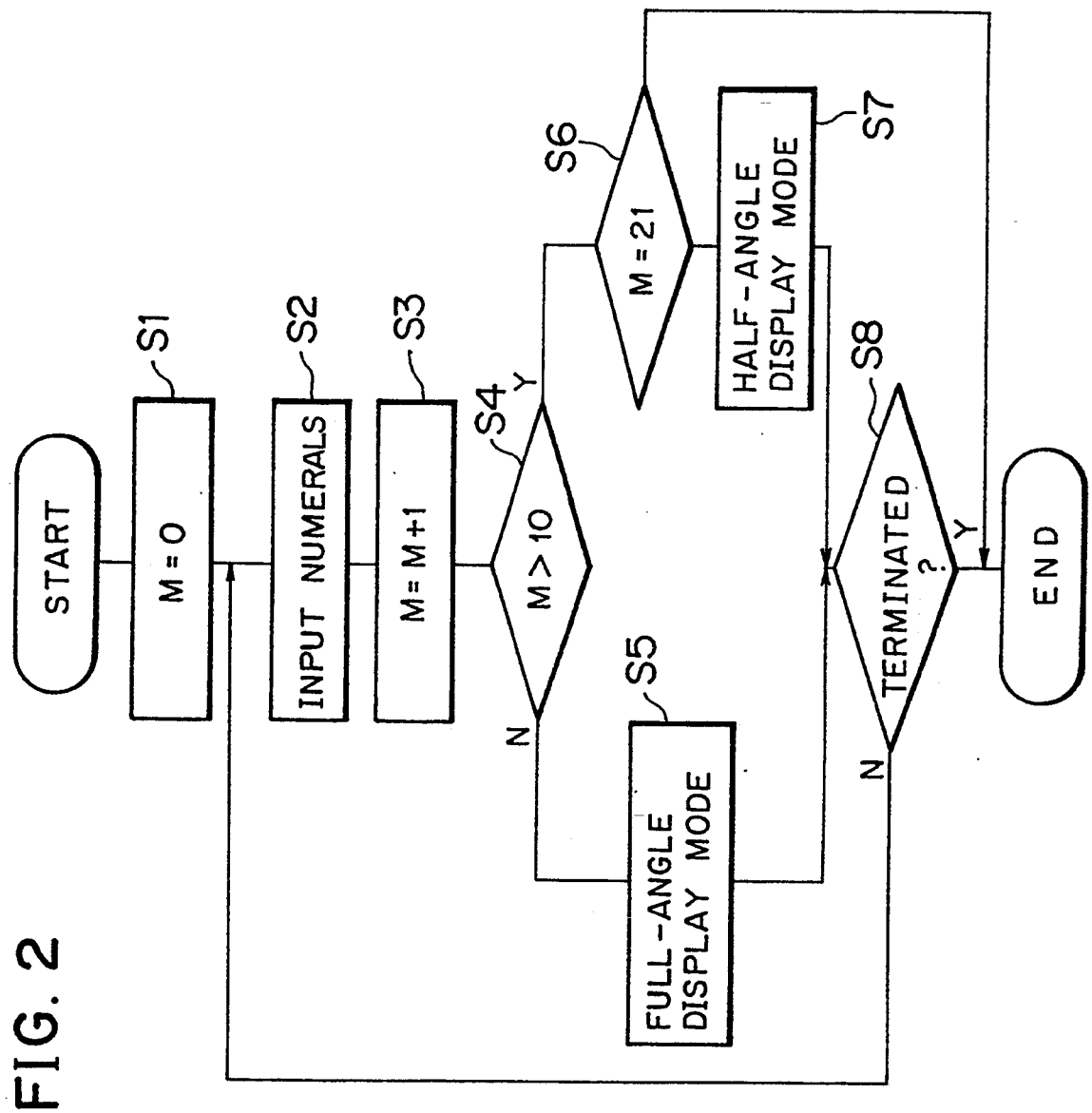
FIG. 2 is a flow chart showing the operation of a control unit employed in FIG. 1.

FIG. 2 is a flow chart showing the operating procedure of the control unit 6. Such operating procedure is prepared in the form of a control program and is stored in the memory 7.

Figure 3:
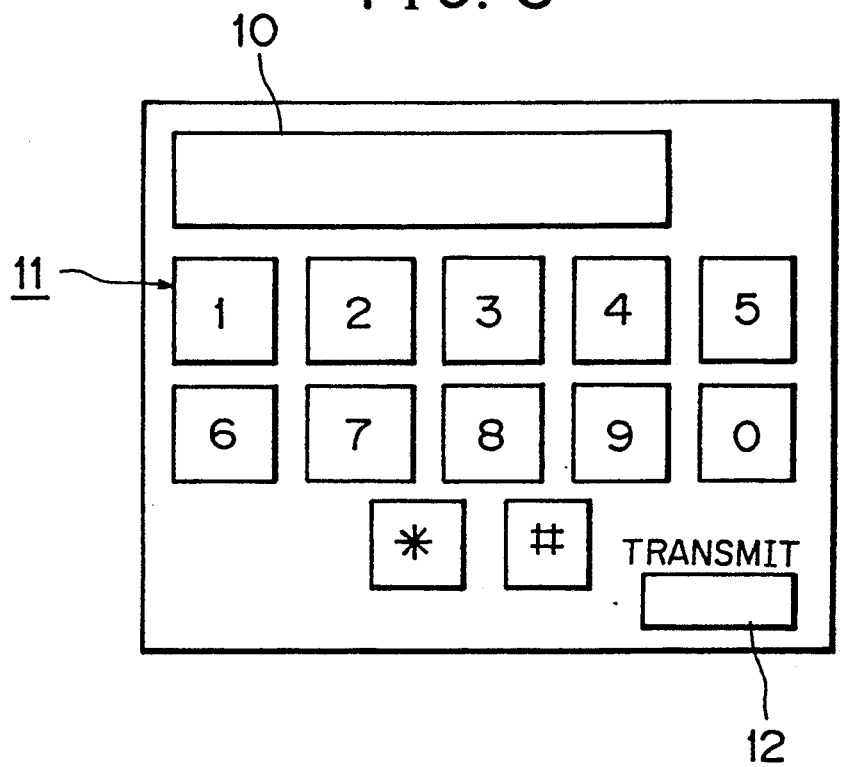
FIG. 3 illustrates a visual representation of soft keys and so forth displayed by an embodiment of the present invention.

FIG. 3 illustrates a touch key arrangement where a visual representation on the display unit 3 is combined with the touch key input section 4. Further shown are a display screen 10 for visually representing an input telephone number; ten numeral keys 11 for inputting numerals 0, 1, ..., 9; and a transmission key 12 for instructing a transmission.

Figure 4A:
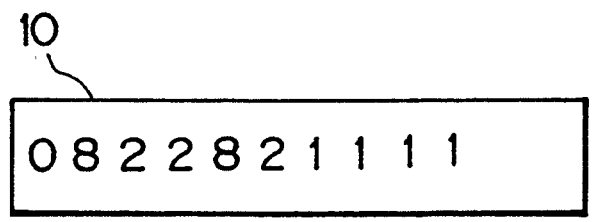
FIGS. 4A–4B illustrate exemplary visual representations of a telephone number obtained in the first embodiment of the present invention.
Figure 4B:
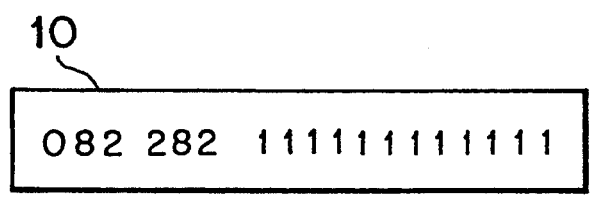

The operation of this embodiment will now be described below with reference to FIGS. 1 through 3. First, in response to a start or off-hook signal generated upon lift of the handset 5, the control unit 6 reads out the display data from the memory 7 and executes a control operation in such a manner as to achieve the visual representation of FIG. 3 on the screen of the display unit 3. Watching the screen shown in FIG. 3, an operator touches the numeral keys 11 to thereby input a desired telephone number in the form of an actuation signal from the touch key input section 4 to the control unit 6. In accordance with each numeral inputted from the touch key input section 4, the control unit 6 reads out the numeral dot pattern corresponding to the numeral input obtained from the memory and then represents such dot pattern visually on the screen 10 of the display unit 3. In this stage of the operation, when the numeral input is composed of less than ten digits, the control unit 6 reads out the dot pattern of a full-angle size. Meanwhile, if the numeral input is composed of more than ten digits, the control unit 6 reads out the dot pattern of a half-angle size and visually represents the pattern on the display screen. FIG. 4 illustrates typical examples of such visual representation on the display screen. FIG. 4A is an example where input numerals of a telephone number are displayed in a full-angle size on the screen 10, and FIG. 4B is another example where such input numerals are displayed in a half-angle size on the screen 10. In comparison with the latter, the numerals of the full-angle size are larger and are therefore easier to be read. Upon termination of inputting the telephone number, the operator touches the transmission key 12 to actuate the same. In reponse to the touch signal obtained from the touch key input section 4, the control unit 6 executes the known procedure of transmission and reception by utilizing the mobile vehicle 2 and the handset 5 toward the telephone of the number being displayed on the screen 10.

Referring now to FIG. 2, a description will be given on the detailed operation of the control unit 6. First in step S1, a total digit count M, which corresponds to the total number of the numeral digits inputted by touching and actuating the touch key input section 4, is set to 0. In step S2, an actuation signal of one numeral is inputted from the touch key input section 4, and the numeral is stored as a least significant digit with a shift of one place in such a manner that the numerals are arrayed in the input order from a most significant digit. In step S3, 1 is added to the total digit count M to update the same. In step S4, a decision is made as to whether the total digit count M is in excess of 10 or not. And if the result of such decision is negative to signify that the total digit count is less than 10, the dot patterns of the full-angle size for the numerals of the total digit count M are read out from the memory 7 and then are represented visually on the display unit 3. In case the total digit count M is greater than 10, the process proceeds to step S6, where a decision is made as to whether the total digit count M is 21 or not. If the total digit count M is 21, the process is terminated. In case the total digit count M is not 21, it is greater than 11 and is smaller than 20. Therefore the process proceeds to step S7, and the dot patterns of the half-angle size for the numerals of the total digit count M are read out from the memory 7 and then are visually represented on the display unit 3. After completion of step S5 or S7, the process proceeds to step S8, where a decision is made as to whether the transmission key 12 is actuated or not in accordance with the signal from the touch key input section 4. If the result of such decision is affirmative to signify the presence of an actuating touch, the process is terminated. Meanwhile, in case the result of the decision is negative, the process is returned to step S2, and the foregoing operation is repeated. The numerals displayed on the screen 10 are erased by the operation of the control unit 6 in response to an end or on-hook signal obtained from the handset 5 at the termination of the call.

Figure 5:
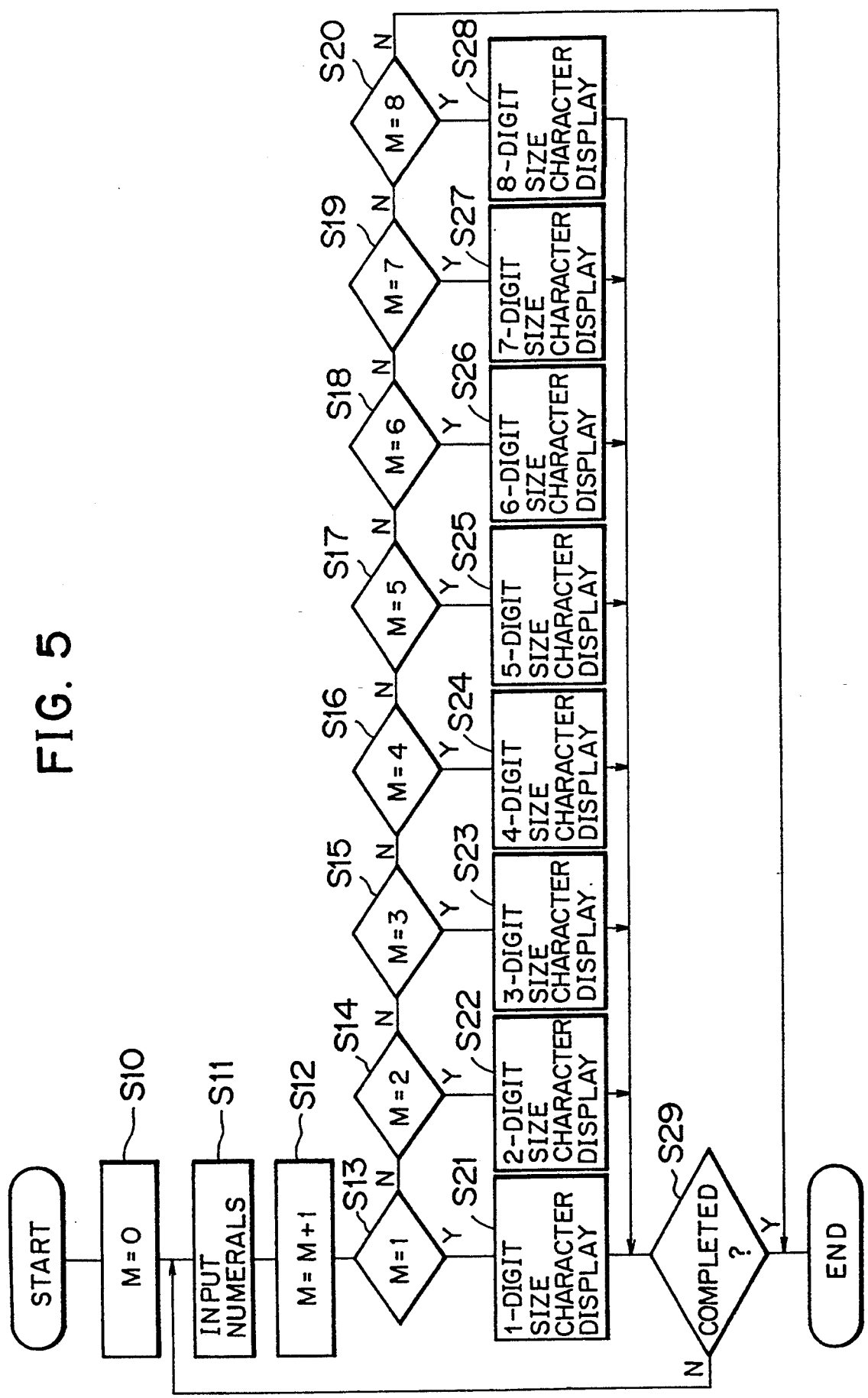
FIG. 5 is a flow chart showing the operation of a control unit employed in a second embodiment of the invention.
Figure 6A:
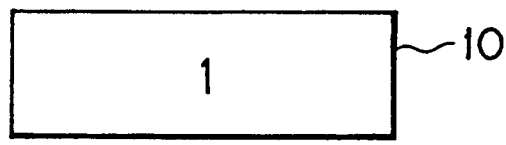
FIG. 6A–6D illustrate exemplary visual representations obtained in the second embodiment.
Figure 6B:
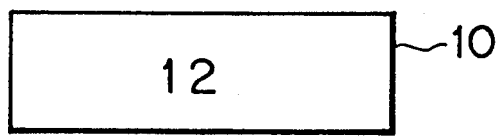
Figure 6C:
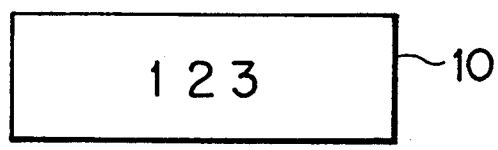
Figure 6D:
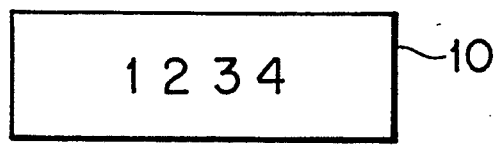

FIG. 5 is a flow chart replacing FIG. 2 of the first embodiment and showing the operating procedure executed in a second embodiment of the present invention. In FIG. 5, first a total digit count M is set to 0 in step S10. Subsequently in step S11, an input numeral is stored as a least significant digit. Next in step S12, 1 is added to the total digit count M to update the same. Then in steps S13 through S20, the renewed digit count M is compared with each of numerical values 1 to 8 sequentially until the relevant value is identified, whereby the total digit count M is determined to be equal to which of the numerical values 1 to 8. In subsequent steps S28 through S21, the dot pattern of the numeral size conforming with the determined digit count M is read out and displayed. The numerals thus displayed are those obtained by shifting the digit places each time a new numeral is inputted in step S11. If the total digit count M is determined not to be 8 in step S20, the count M is not any of 1 through 8, so that the process is terminated. After completion of any one of steps S21 through S28, the process proceeds to step S29 where a decision is made as to whether the process is terminated or not. If the result of such decision signifies no termination, the process is returned to step S11, and the foregoing operation is repeated. Meanwhile, in case the result of the decision signifies termination, one cycle of the operating procedure is completed.

FIG. 6 illustrates exemplary visual representations of characters obtained by the operation of FIG. 5. FIG. 6A is an example of a 1-digit size where one character is composed of 56 dots in each of vertical and horizontal directions; FIG. 6B is an example of 2-digit size where one character is composed of 48 dots in each direction; FIG. 6C is an example of a 3-digit size where one character is composed of 40 dots in each direction; and FIG. 6D is an example of a 4-digit size where one character is composed of 32 dots in each direction. Although not illustrated, one character is composed, in each of vertical and horizontal directions, of 24 dots in a 5-digit size, 16 dots in a 6-digit size, 12 dots in a 7-digit size, and 8 dots in an 8-digit size, respectively. As mentioned above, the size of each character to be displayed is rendered greater in accordance with reduction in the total digit count of numerals, hence attaining enhanced visual ease.

Figure 7:
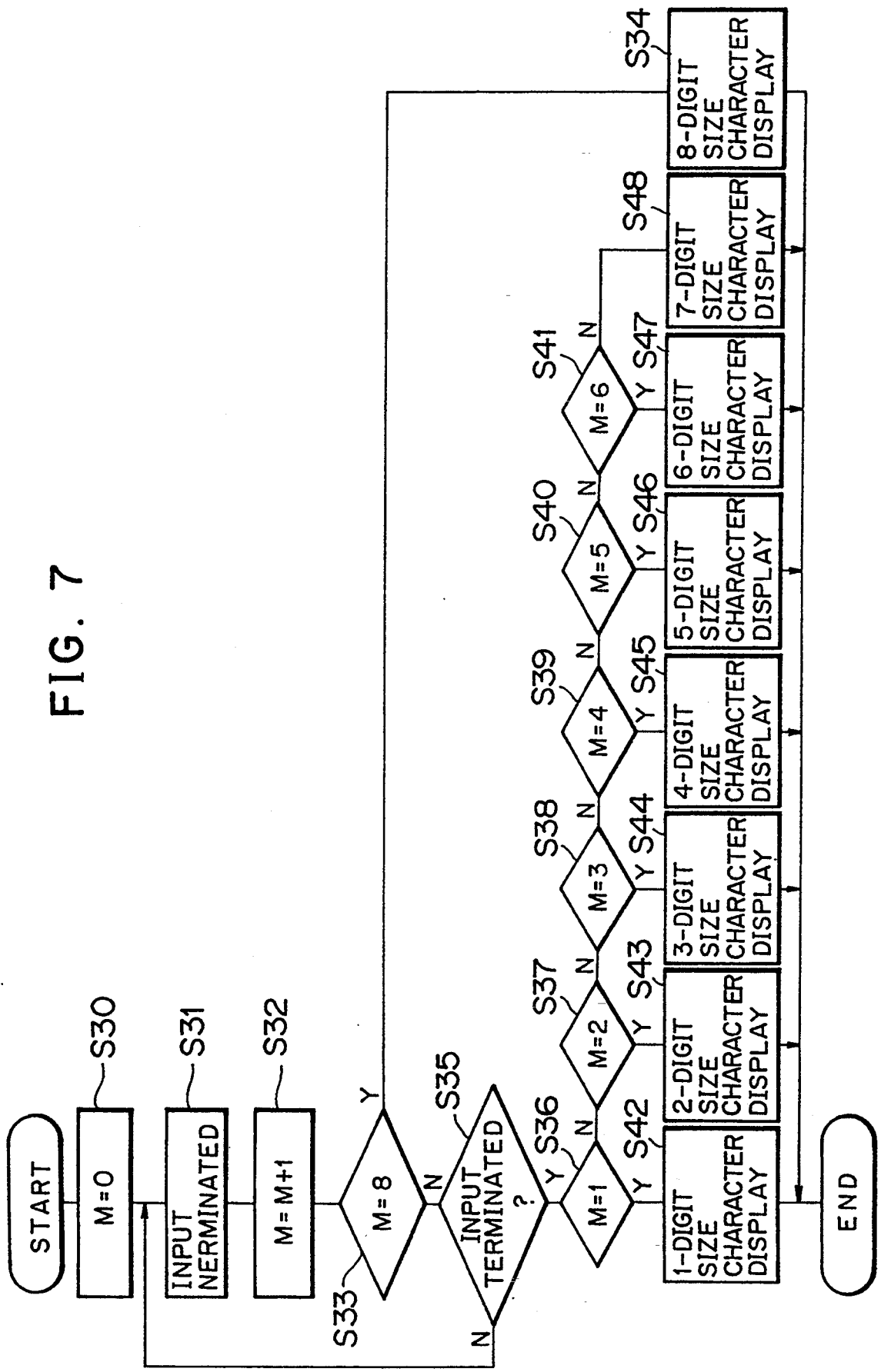
FIG. 7 is a flow chart showing the operation of a control unit employed in a third embodiment of the invention.

FIG. 7 is another flow chart replacing FIG. 2 of the aforementioned first embodiment and showing the operating procedure executed in a third embodiment of the present invention. In FIG. 7, first a total digit count M is set to 0 in step S30. Subsequently in step S31, an input numeral is stored as a least significant digit, and each of succeeding input numerals is stored with a shift of the digit place. Next in step S32, 1 is added to the total digit count M to update the same. In step S33, a decision is made as to whether the total digit count M is 8 or not. And if the result of such decision is affirmative to signify that the digit count M is 8, the process proceeds to S34 where the characters are displayed in an 8-digit size. Meanwhile, in case the result of the above decision signifies that the digit count M is not 8, the process proceeds to step S35. Then a decision is made in step S35 as to whether the input is terminated or not. When a transmission command is not existent, the input is not yet terminated, so that the process is returned to step S31. To the contrary, if a transmission command is existent, it signifies termination of the input, so that the process proceeds to step S36. In steps S36 through S41, a decision is made as to whether the total digit count M is any of 1 through 7. Subsequently in steps S42 through S48, the dot pattern of the total digit count size conforming with the result of such decision is read out, and the characters are visually represented on the display screen. The procedure is completed upon termination of processing any one of steps S42 through S48 or step S34. The sizes of the displayed characters are the same as those in FIG. 6 described with regard to the second embodiment.

Although the embodiments have been explained in respect of an example of applying the present invention to an automotive telephone equipment, it is to be understood that the present invention is applicable also to an electronic desk calculator, an electronic pocket notebook or the like. And any of numerals, kanji characters, hiragana characters, katakana characters, alphabetical letters, signs, symbols and so forth can be visually represented on the display unit. Furthermore, the input keys are not limited to soft keys alone and may be hard ones as well.

As described hereinabove, according to the present invention where characters can be displaced in relatively greater sizes in accordance with a reduction in the number of characters to be visually represented, it is remarkably effective to ensure easy-to-see representation on a display screen.

What is claimed is:

1. A display device for displaying characters in a form of dot patterns comprising:
   input means for inputting characters one at a time;
   display means for displaying a dot pattern corresponding to each inputted character as each character is inputted;
   count means for counting a number of characters inputted and for generating a count after the input of each character; and
   character generating means, operatively connected to said count means and said input means, for generating the dot pattern to be displayed according to each inputted character;
   said character generating means generating and re-generating dot patterns having distinct sizes such that the size of the dot pattern for displaying a first character is larger than the size of the dot pattern for displaying said first character and a second character and the size of the dot pattern for displaying said first and second characters and a third character is smaller than a dot pattern for displaying said first and second characters;
   said display means displaying and re-displaying said dot patterns having said distinct sizes;
   said character generating means reducing the size of the dot pattern in response to the inputting of each character until a predetermined number of characters have been inputted.

2. The apparatus of claim 1, wherein the display device is part of an on-vehicle information system.

3. The apparatus of claim 1, wherein the display device is part of a telephone.

4. The display apparatus of claim 1 wherein the display device is part of a calculator.

5. The display apparatus of claim 1 wherein the display device is part of an electronic notebook.

6. A method for displaying characters in a form of dot patterns comprising the steps of:
   (a) inputting characters one at a time;
   (b) displaying a dot pattern corresponding to each inputted character as each character is inputted;
   (c) counting a number of characters inputted;
   (d) generating a count after the input of each character; and
   (e) generating the dot pattern to be displayed according to each inputted character;
   said step (e) including the sub-steps of,
      (e1) generating a plurality of dot patterns having distinct sizes, and
      (e2) displaying the dot patterns;
   said sub-step (e1) generating the dot patterns such that a dot pattern size for displaying a first character is larger than a dot pattern size for displaying the first character and a second character and the size of the dot pattern for displaying the the first and second characters and a third character is smaller than a dot pattern size for displaying the first character and the second character;
   said sub-step (e1) reducing the dot pattern size in response to the inputting of each character until a predetermined number of characters have been inputted.

7. A display apparatus for displaying characters, comprising:
   a keypad for inputting characters one at a time;
   a display, displaying each inputted character as each character is inputted;
   a counter, operatively connected to said keypad, counting the number of characters inputted and outputting a count after the input of each character;
   a controller, operatively connected to said keypad, said counter and said display, generating and re-generating character signal commands such that said display displays only a first character with a first size, displays only the first character and a second character, each with a second size, and displays only the first character, the second character and a third character, each with a third size, wherein the first size is larger than the second size, and the second size is larger than the third size, and
   said controller reduces the size of each character displayed by said display in response to the inputting of each character until a predetermined number of characters have been inputted.

8. The display apparatus of claim 7, wherein said controller includes:
   a display sub-controller, controlling the visual representation on said display;
   a memory for storing the control program and dot patterns of characters; and
   a central processing unit, computing and processing digital data in accordance with a predetermined control program.

9. The display apparatus of claim 7 wherein said display is part of an on-vehicle information system.

10. The display apparatus of claim 7 wherein said display is part of a telephone.

11. The display apparatus of claim 7 wherein said display is part of a calculator.

12. The display apparatus of claim 7 wherein said display is part of an electronic notebook.

* * * * *